(12) United States Patent
Kobayashi

(10) Patent No.: US 6,834,738 B2
(45) Date of Patent: Dec. 28, 2004

(54) POWER TRANSMITTING SYSTEM FOR FOUR-WHEEL DRIVE VEHICLE

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 569 days.

(21) Appl. No.: 09/816,146

(22) Filed: Mar. 26, 2001

(65) Prior Publication Data

US 2003/0141127 A1 Jul. 31, 2003

(30) Foreign Application Priority Data

Mar. 24, 2000 (JP) ..................................... P.2000-084827
Mar. 30, 2000 (JP) ..................................... P.2000-094938

(51) Int. Cl.[7] ............................................. B60K 17/344
(52) U.S. Cl. ..................................... 180/233; 180/247
(58) Field of Search .............................. 180/233, 244, 180/247, 297

(56) References Cited

U.S. PATENT DOCUMENTS

| | | | | |
|---|---|---|---|---|
| 4,605,087 A | * | 8/1986 | Ashauer et al. | 180/248 |
| 4,618,022 A | * | 10/1986 | Hayashi | 180/249 |
| 4,747,643 A | * | 5/1988 | Lanzer | 303/2 |
| 4,805,718 A | * | 2/1989 | Iwata et al. | 180/233 |
| 4,830,136 A | * | 5/1989 | Sommer | 180/233 |
| 6,055,488 A | * | 4/2000 | Nakajima | 702/96 |

FOREIGN PATENT DOCUMENTS

| | | | |
|---|---|---|---|
| EP | 0409529 | * | 7/1990 |
| JP | 62-59132 | | 3/1987 |
| JP | 6-92156 | | 4/1994 |
| JP | 6-107019 | | 4/1994 |
| JP | 7-223455 | | 8/1995 |
| JP | 9-58287 | | 3/1997 |
| JP | 10-291422 | | 11/1998 |
| JP | 11-235933 | | 8/1999 |

* cited by examiner

Primary Examiner—Anne Marie Boehler
(74) Attorney, Agent, or Firm—Smith, Gambrell & Russell LLP

(57) ABSTRACT

In a power transmitting system of a four-wheel drive vehicle in which driving force provided from a transmission coupled to a laterally mounted front drive engine is distributed to front and rear wheels through a transfer disposed behind the engine, the transfer comprises a pair of bevel gears which change a transmission direction of the driving force; a first and second gears which shift an axis of a pinion shaft in parallel; and an output shaft which is rotatably inserted into the second gear. A hydraulic multi plate clutch couples the second gear and the output shaft so that engagement and disengagement are freely allowed, and is disposed on the axis of the second gear and more closely to the engine 1 side than the second gear. Additionally, a spline shaft formed at a top of an input shaft of the propeller shaft is spline-fitted into the second output shaft. Thereby, back-and-force shift is allowed. A steering gear box is located in downward of the front side input shaft.

4 Claims, 9 Drawing Sheets

POWER TRANSMITTING SYSTEM FOR FOUR-WHEEL DRIVE VEHICLE

BACKGROUND OF THE INVENTION

1. Field of the Invention

The present invention relates to a power transmitting system of a four-wheel driving vehicle which distributes driving force outputted from a transmission coupled to a laterally mounted front drive engine onto a front wheel and a rear wheel.

2. Description of the Related Art

Conventionally, as a transmission system of a vehicle, particularly, for a four wheel drive vehicle, a coupling mechanism section such as a hydraulic multi plate clutch or a viscous coupling is disposed in a transfer. A distribution of driving force onto a rear wheel is continuously controlled through the coupling mechanism section. Incidentally, in the four wheel drive vehicle in which an engine is laterally arranged, the coupling mechanism section is generally arranged on an axis line of a front wheel driving shaft or on an axis line of a pinion shaft of bevel gears.

For example, in a Japanese Patent Unexamined Publication No. Hei. 7-223455 (JP-A-7-223455), there is disclosed a viscus coupling (coupling mechanism section) which is provided on a side of a differential gear between front wheels, for transmitting a driving force inputted from the differential gear to rear wheels.

In addition, in a Japanese Patent Unexamined Publication No. Hei. 6-107019 (JP-A-6-107019), there is disclosed a hydraulic servo wet type multi plate clutch (coupling mechanism section) which is disposed between an output gear of a hypoid pinion of a transfer unit and a propeller shaft for rear wheel.

However, as described above, in case that the coupling mechanism section is disposed on the axis line of the front wheel driving shaft, a position of the differential gear for being disposed in a transfer is restricted. Further, in some frame structure of a body, when transfer becomes large-sized in a direction of an axle shaft, a mountability thereof is reduced.

While, when the coupling mechanism section is disposed on the axis line of the pinion shaft of the bevel gears, the transfer becomes large-sized in the direction from front to rear. In such case, the coupling mechanism section with a large diameter generally intersect at above or below of a steering gearbox or a body frame structure (cross member etc.). Here, in order to keep a good positional relation among the cross member etc. and coupling mechanism secrion, to change in the position of the steering gear box or to bend the cross member etc. causes a complicated body constitution or an increase in the number of models for vehicles. Moreover, when the coupling mechanism section with a large diameter intersect above or below of the steering gear box or the cross member etc., it causes that a cabin space or a ground clearance of a vehicle is reduced.

Also, a driving force from a transmission coupled to a laterally mounted front drive engine is transmitted, through a gear mechanism including bevel gears such as hypoid gears, to a transmission shaft section such as a propeller shaft longitudinally arranged at a backward of the gear mechanism. From the transmission shaft section, the driving force is transmitted to a final reduction gear unit of rear wheels. Therefore, an output shaft from the gear mechanism is protruded in a backward of the vehicle and coupled to an input shaft of the transmission shaft section.

For example, in a Japanese Patent Unexamined Publication No. Hei. 10-291422 (JP-A-10-291422), there is disclosed a technology in which driving force by a transverse engine is transmitted from a front wheel differential gear unit, through a ring gear and a pinion gear (a pair of bevel gears) as hypoid gears, to an output shaft extending in a backward of the pinion gears. From which output shaft, the driving force is transmitted to a propeller shaft.

Incidentally, in order to transmit the driving force from an engine to rear wheels, it is important for transmittance of the driving force that a steering gear box and body frame members or the like, in front arranged from side to side to the vehicle, are arranged to be prevented from geometrically intersecting mutually. That is, a cabin space, a steering characteristic, a ground clearance etc are strongly depended on the structure to be arranged in such a manner that the driving force is transmitted without being interfered with the steering gear box and body frame members or the like.

In general, in the case of a laterally mounted front drive engine, at immediately backward of the gear mechanism, small diameter portions are provided on each of the output shaft of the gear mechanism and the input shaft of the transmission shaft section so that such objects as a steering gear box and body frame members in front are geometrically avoided. Therefore, it is required that the transmission and gear mechanism are made smallest possible. It is required that the section of the shaft, which have small diameter, is protruded in the backward from a suitable position of the gear mechanism and provided with a small diameter, for avoiding an interference with one another.

In JP-A-10-291422, a pair of the bevel gears are provided, an input shaft section of the propeller shaft is directly coupled to an output shaft extending backward from a pinion gear as a driven gear of the pair of the bevel gears. In such constitution, there is no other gear trains, therefore, the number of parts to be installed can be reduced, and it is advantageous for downsizing.

However, from a view of a positional relation between an outlet position from the bevel gears and the differential gear unit being independent (relation to the position of disposing the propeller shaft), it causes a problem of reducing a degree of design flexibility in making an intersecting axes angle in a universal joint fall within a specified allowed value for suppressing vibration and noise, in the upper and lower sides and in the left and right sides of the vehicle.

In addition, particularly in a four wheel drive vehicle, for designing a vehicle to be a 4WD with functions and performances of the steering gear box and body frame members being made well exhibited, a degree of flexibility is too lowered, since it is necessary to layout a structure in which a transmitting power from a power transfer system between the front and rear wheels to the propeller shaft. This also causes a problem of increasing items to be made compromised.

SUMMARY OF THE INVENTION

The present invention has been made in view of foregoing with a first object of providing a power transmitting system of a vehicle, particularly a four wheel drive vehicle in which power transmitting system can be constituted to be compact, and have a good mountability.

Also, the invention has been made in view of foregoing with a second object of providing a power transmitting system of a vehicle which system is small, capable of keeping a good positional relation of a steering mechanism without changing a geometrical arrangement thereof. The power transmitting system of the present invention makes advantageous in suppressing vibration and noise while easily overcoming specified limitations. The present invention produces the power transmitting system easily made to comply with various variation in specification of an engine or a body, and provided with a high degree of flexibility in setting.

In order to solve above problems, according to a first aspect of the present invention, in a power transmitting system of a four wheel drive vehicle, driving force provided from a transmission coupled to a laterally mounted front drive engine is distributed to front and rear wheels through a transfer disposed behind the engine, the transfer comprises a pair of bevel gears which change a transmission direction of the driving force; a first gear provided on a transmission shaft section for the driving force whose transmission direction is changed by the bevel gears; a second gear engaged with the first gear for shifting an axis of the transmission shaft section in parallel to itself; an output shaft which is rotatably inserted into a gear shaft of the second gear, for allowing the driving force to be transmitted to a propeller shaft; and a coupling mechanism section which can control a transmission torque between the gear shaft of the second gear and the output shaft. The coupling mechanism section is disposed on the axis of the second gear more closely to the engine side than the second gear.

In addition, in a power transmitting system of a four wheel drive vehicle, a coupling mechanism-containing chamber for containing the coupling mechanism section is independently provided in a transfer case of the transfer. Liquid tight separation, between the coupling mechanism-containing chamber and other containing chambers containing other parts, is performed by providing a seal member made slidably contacted around the gear shaft of the second gear extendedly provided into the coupling mechanism-containing chamber.

Moreover, in a power transmitting system of a four wheel drive vehicle, a hydraulic multi plate clutch capable to be applied for the coupling mechanism section.

Furthermore, in a power transmitting system of a four wheel drive vehicle, the coupling mechanism section is a coupling which generates a transmission torque depending on a difference between a front wheel rotating speed and a rear wheel rotating speed or on an input torque.

According to a second aspect of the present invention, in a power transmitting system of a vehicle, in which driving force provided from a transmission coupled to a front engine is transmitted through a gear mechanism to a transmission shaft section, the driving force is transmitted from the transmission shaft section to a final reduction gear unit of rear wheels. An axis line of an output shaft of the gear mechanism is arranged to locate one of above and below of members for constituting vehicle, the members being provided from side to side to the vehicle. The output shaft is formed into a hollow shaft with inside face thereof made to be a spline hole. An input shaft of the transmission shaft section is formed into a spline shaf. Here, the output shaft and the input shaft are slidably spline-fitted.

That is, in this power transmitting system of a vehicle, an axis line of an output shaft of the gear mechanism is arranged to locate one of above and below of members for constituting vehicle (hereinafter "the vehicle constituting members"), the vehicle constituting members being provided from side to side to the vehicle. In this structure, vehicle constituting members are easily arranged at the optimum position in a wide space. For example, the vehicle constituting members taken as a steering gear box is capable of keeping a good positional relation to the power transmitting system without changing a geometrical arrangement of the steering mechanism. Thus, the power transmitting system can have advantageous in suppressing vibration and noise while easily overcoming specified limitations. In addition, a high degree of flexibility can be kept with respect to a position of arranging the vehicle constituting member, such as the steering gear box, so that the transmission system is allowed to comply with various variations in specification of an engine or a body.

In a power transmitting system of a vehicle, a transaxle is coupled to a laterally mounted front drive engine. A gear mechanism is provided in connection with a front differential gear unit. Here, a power given from the transaxle is transmitted through the gear mechanism to a transmission shaft section. The power is transmitted from the transmission shaft section to a final reduction gear unit of rear wheels. The gear mechanism has bevel gears and helical gears. An axis line of an output shaft of the gear mechanism is arranged to locate one of above and below the vehicle constituting members provided from side to side to the vehicle. The output shaft is formed into a hollow shaft with inside face thereof formed into a spline hole. An input shaft of the transmission shaft section is formed into a spline shaft. The output shaft and the input shaft are slidably spline-fitted.

That is, in this power transmitting system of a vehicle in which a laterally mounted front engine is installed, the axis line of the output shaft of the gear mechanism is arranged to locate one of above and below a vehicle constituting members provided from side to side to the vehicle. In this structure, the vehicle constituting members to be easily arranged at the optimum position in a wide space are allowed. For example, the vehicle constituting members taken as a steering gear box is capable of keeping a good positional relation to the power transmitting system without changing a geometrical arrangement of the steering mechanism. Thus, the power transmitting system have advantageous in suppressing vibration and noise while easily overcoming specified limitations. In addition, a high degree of flexibility can be kept with respect to a position of arranging the vehicle constituting members, such as the steering gear box, so that various variations in specification of an engine or a body capable to be applied are allowed.

Moreover, in a power transmitting system of a vehicle in which a transaxle coupled to a laterally mounted front drive engine is provided, a gear mechanism is provided in connection with a front differential gear unit. A power given from the transaxle is transmitted through the gear mechanism to a transmission shaft section, the power is transmitted from the transmission shaft section to a final reduction gear unit of rear wheels. The gear mechanism has bevel gears and helical gears. At least one of an output shaft of the gear mechanism and an input shaft of the transmission shaft section is formed into a solid shaft. And a flange joint is provided at an end of each of the output shaft and the input shaft. The solid shaft is arranged to locate one of above and below a vehicle constituting members provided from side to side to the vehicle. The output shaft and the input shaft are flange coupled each other at a front side or backward of the vehicle constituting members.

That is, in the power transmitting system of a vehicle with a laterally mounted front drive engine, the solid shaft is arranged to locate one of above and below a vehicle constituting members provided from side to side to the vehicle. In this structure, the diameter of the shaft is made reduced, the shaft being located at least one of above or below the vehicle constituting members. Furthermore, when coupling the output shaft of the gear mechanism and the input shaft of the transmission shaft section with the flange joint, the flange joint having the largest diameter is made located in such a manner that the position of the vehicle constituting members is avoided without interfering with the power transmission. In this structure, the vehicle constituting members such as the steering gear box are allowed to be easily arranged at the optimum position in a wide space. Thus, a good positional relation of a steering mechanism to the power transmitting system can be kept without changing a geometrical arrangement of the steering mechanism, and the power transmitting system is made advantageous in suppressing vibration and noise while easily overcoming specified limitations. In addition, a high degree of flexibility can be kept with respect to a position of arranging the vehicle constituting members such as the steering gear box, so that various variations in specification of an engine or a body are realized.

In addition, the output shaft of the gear mechanism has a helical gear provided around the shaft, the helical gear constituting the gear mechanism. In this structure, the gear mechanism to be further downsized is allowed to large the degree of flexibility in arranging the vehicle constituting members.

Moreover, on the input shaft of the transmission shaft section, a narrowed section with a diameter which corresponding to a shape of the vehicle constituting members is provided so that a transmission strength of transmitted power is ensured. By providing such narrowed section, it becomes possible to avoid vehicle constituting members having various shapes, in positions.

Furthermore, the gear mechanism comprises at least one pair of gears which shifts the output shaft in parallel with itself. In this structure, it is possible that the output shaft of the gear mechanism is freely located, according to the arrangement of the vehicle constituting members. In addition, a gear ratio of the pair of gears is freely determined so that the realization of the optimum power transmission is allowed.

DETAILED DESCRIPTION OF THE PREFERED EMBODIMENT

Figure 1:
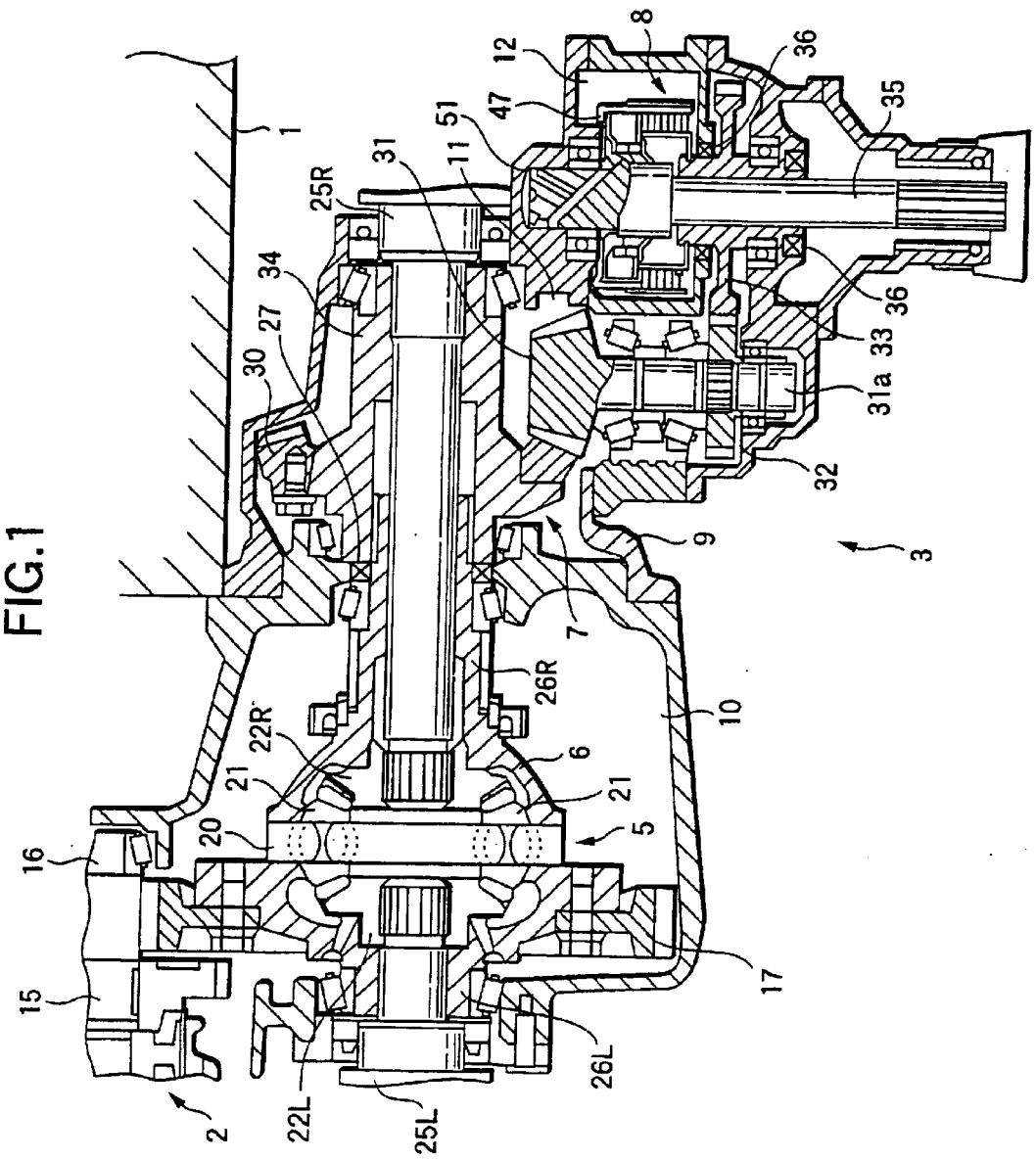
FIG. 1 is a cross sectional view of a principal part of a transfer.
Figure 2:
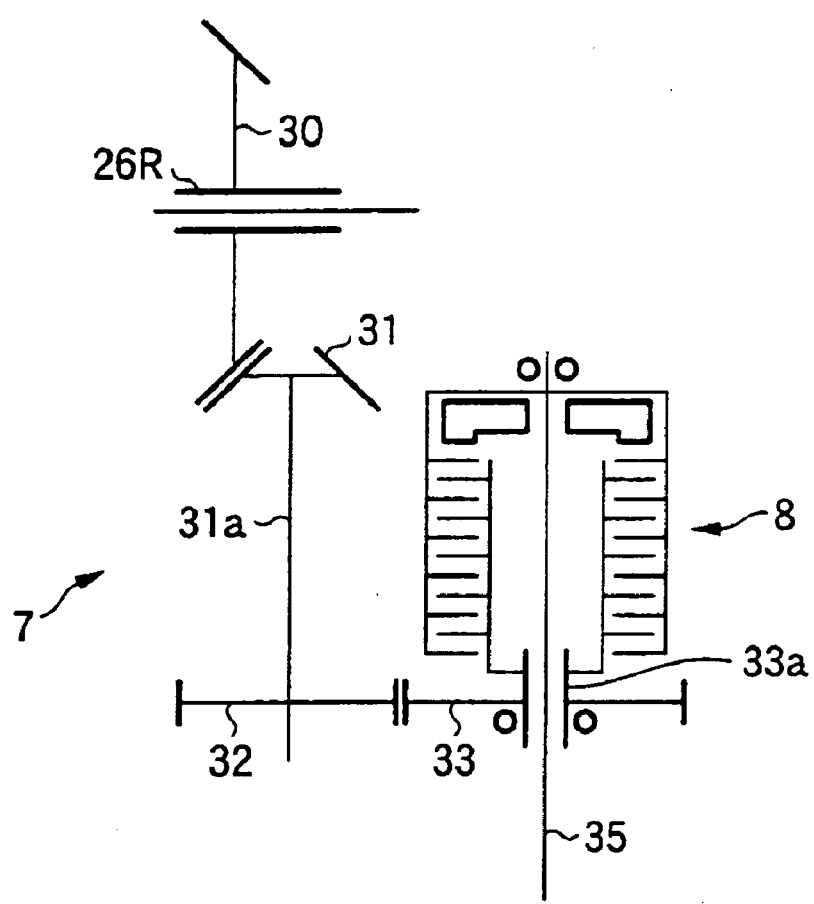
FIG. 2 is a skeleton diagram of a gear mechanism section and a hydraulic multi plate clutch.
Figure 3:
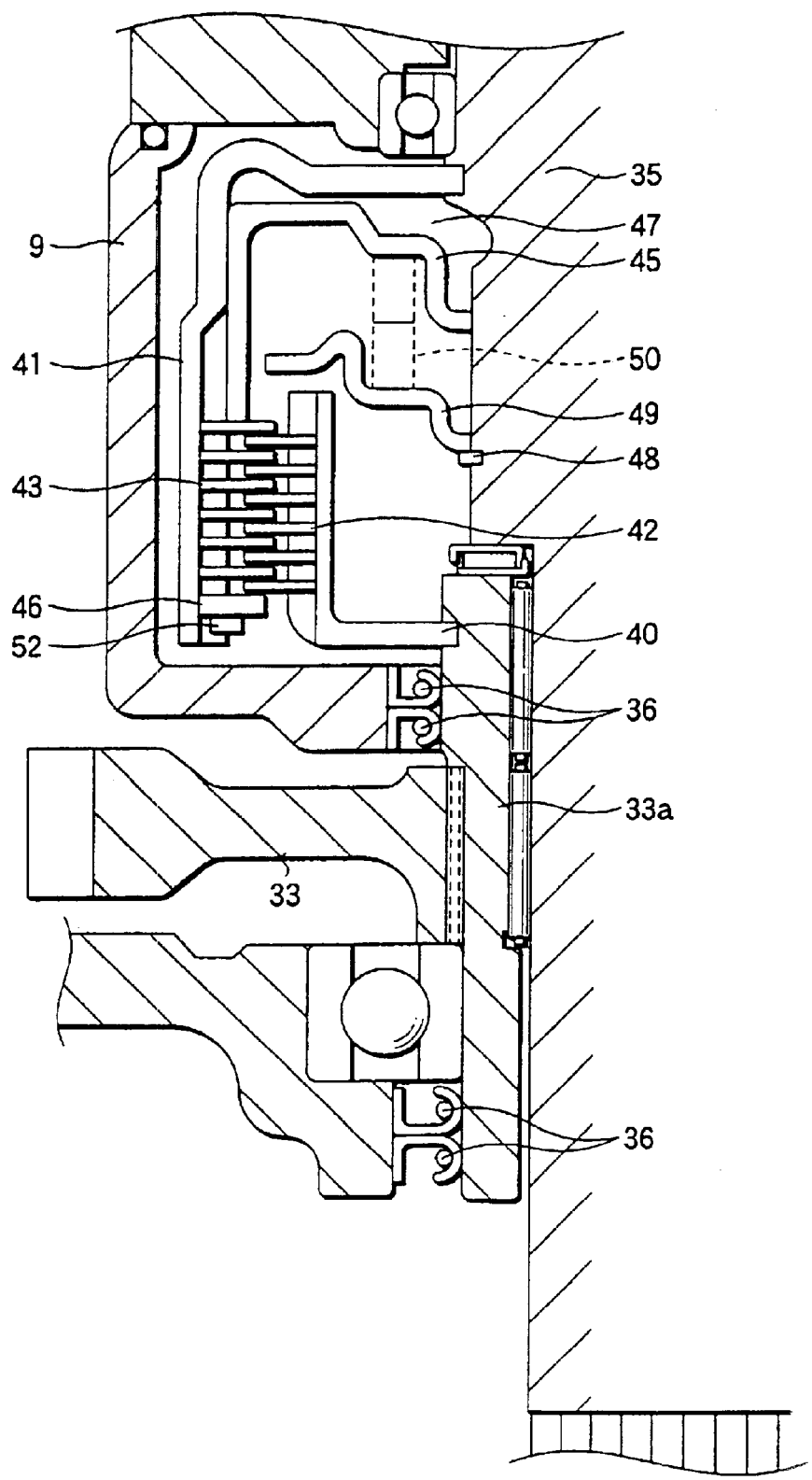
FIG. 3 is an enlarged cross sectional view of a principal part of a clutch chamber.
Figure 4:
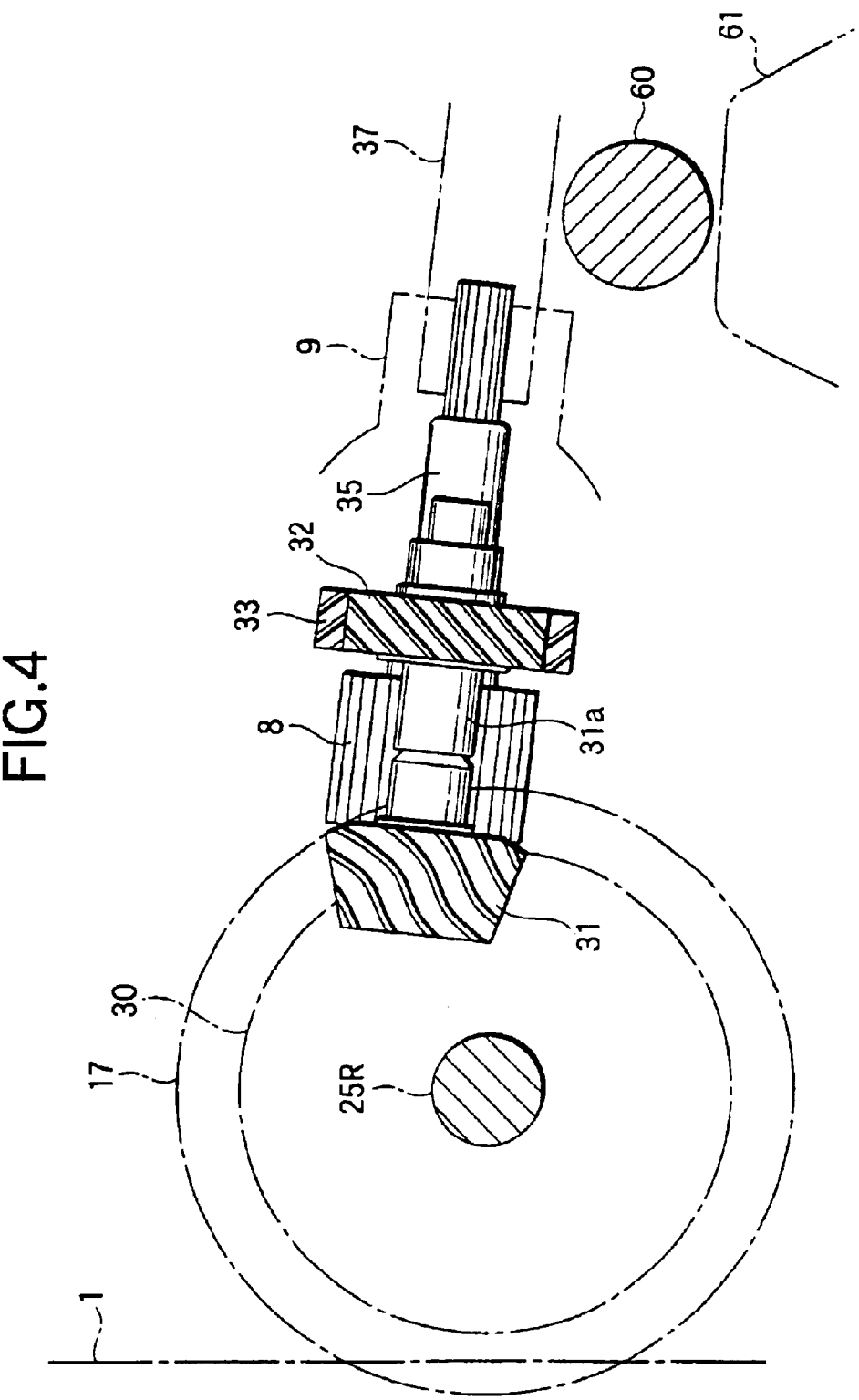
FIG. 4 is a side view showing a positional relation among a transfer shaft, a steering gear box and a cross member.
Figure 5:
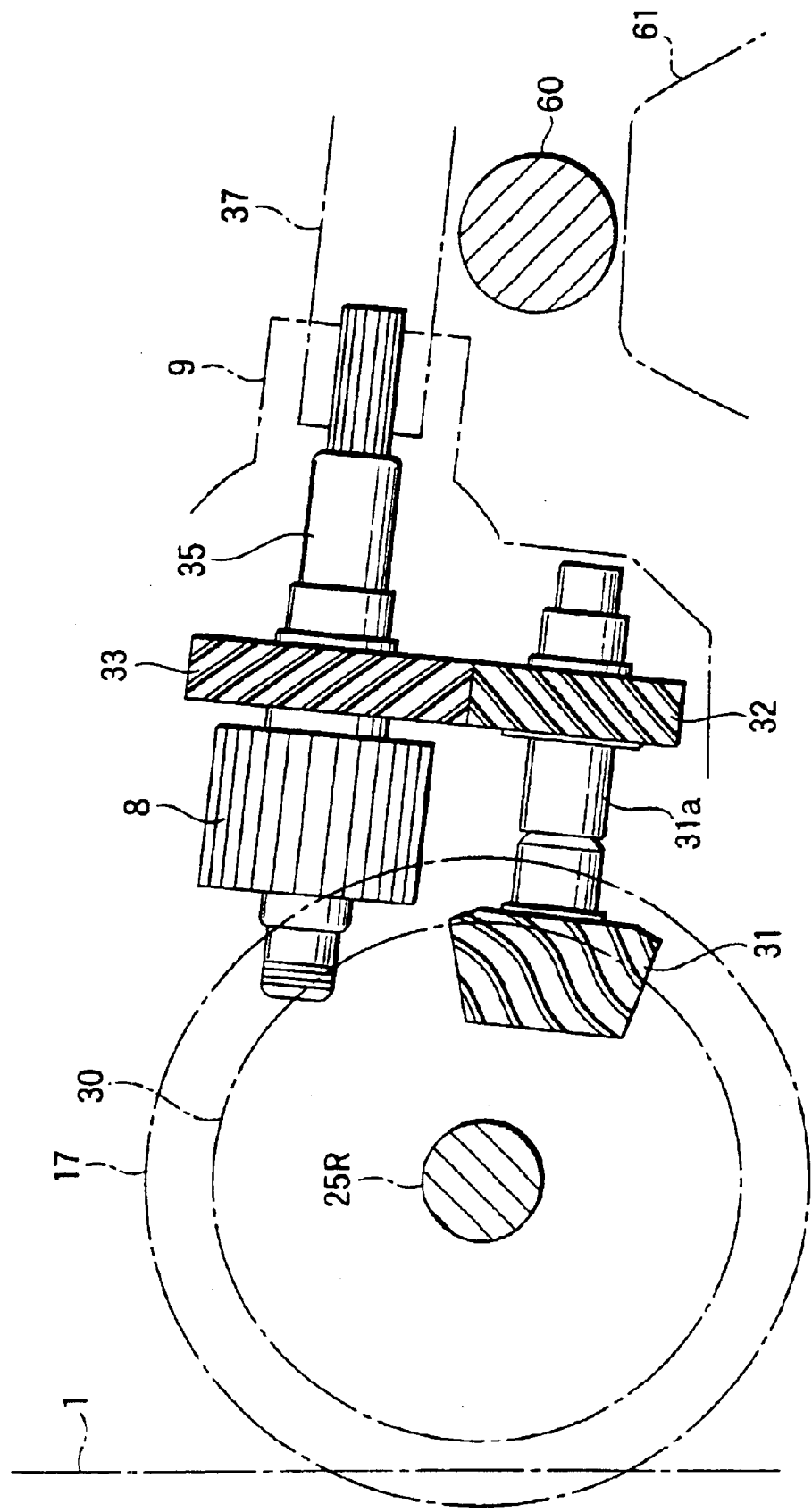
FIG. 5 is a side view showing another positional relation among a transfer shaft, steering gear box and cross member.
Figure 6:
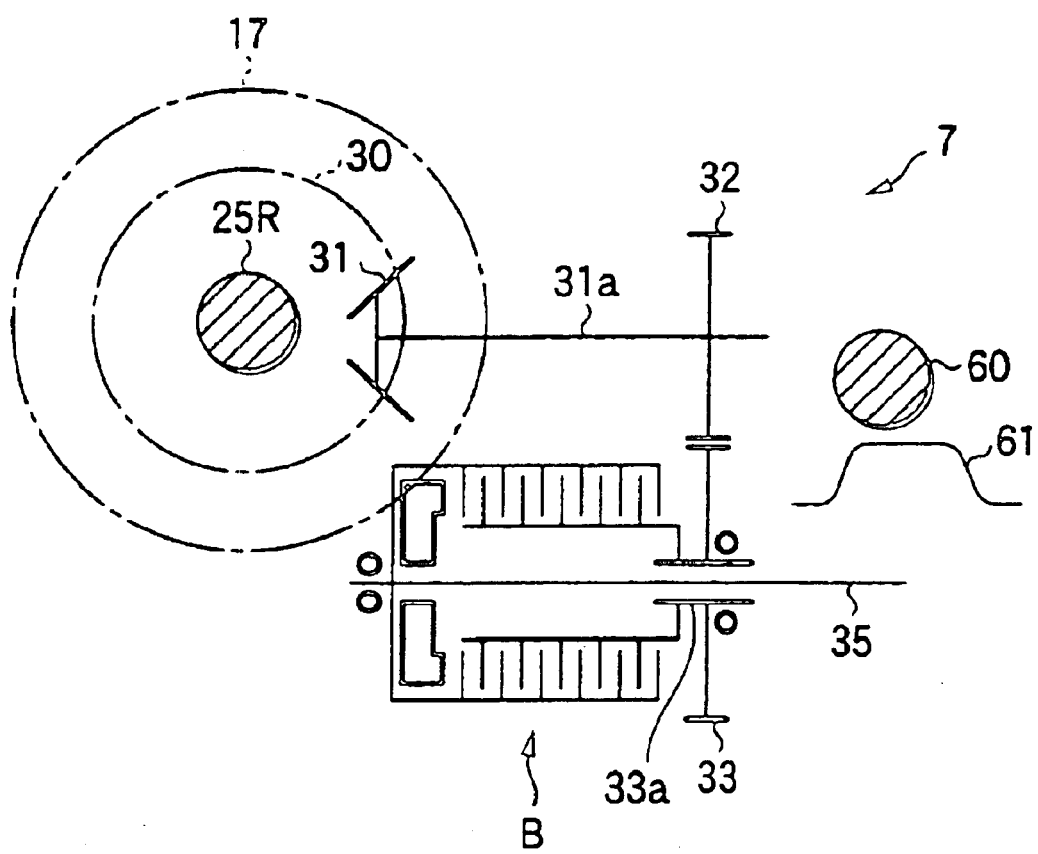
FIG. 6 is a skeleton diagram showing another positional relation among a transfer shaft, a steering gear box and a cross member.

An embodiment of the present invention will be explained in the following with reference to drawings. The drawings relate to the embodiment of the present invention. FIG. 1 is a cross sectional view of a principal part of a transfer, FIG. 2 is a skeleton diagram of a gear mechanism section and a hydraulic multi plate clutch, FIG. 3 is an enlarged cross sectional view of a principal part of a clutch chamber, FIG. 4 is a side view showing a positional relation among a transfer output shaft, a steering gear box and a cross member, FIG. 5 is a side view showing another positional relation among a transfer output shaft, steering gear box and cross member, and FIG. 6 is a skeleton diagram showing another positional relation among a transfer output shaft, a steering gear box and a cross member.

In FIG. 1, reference numeral 1 denotes a laterally mounted front drive engine in a front engine room of a vehicle. A transmission 2 is jointed on the left side of the engine 1. A transfer 3 is integrally provided on a backward of the transmission 2. After a revolution thereof is changed to a specified one by the transmission 2, a driving force outputted from the engine 1 is distributed by the transfer 3 onto both of front wheel and rear wheel. Here, as shown in the figure, the transfer 3 is arranged behind the transmission 2 with an offset toward the engine 1.

Specific explanation will be given about the transfer 3. The transfer 3 comprises a front differential unit 5 which transmits the driving force from the transmission 2 to the front wheel, a gear mechanism section 7 which distributes the driving force, transmitted to a differential case 6 of the front differential unit 5, to the rear wheel, and a hydraulic multi plate clutch 8 as a coupling mechanism section which continuously carries out a variable control of distribution of the driving force to the rear wheel in response to a running condition, road surface condition and the like. The above constituents are respectively contained in a differential containing chamber 10, a gear containing chamber 11 and a clutch containing chamber 12 as a coupling mechanism-containing chamber which are provided in a transfer case 9 so that a principal part of the transfer 3 is constituted.

That is, in the front differential unit 5, a final gear 17 is provided on an outer periphery of the differential case 6. The final gear 17 is engaged with a drive gear 16 fixed to an output shaft 15 of the transmission 2.

The front differential unit 5 is a bevel gear-type differential unit. The front differential unit 5 is constituted by comprising a pair of differential pinions 21, 21 being rotatably supported around a pinion shaft 20 fixed in the differential case 6, a left and right side gears 22L and 22R engaged with the differential pinions 21, 21, and or the like. The driving force transmitted from the differential case 6 to the side gears 22L and 22R through the differential pinions 21, 21, is to be transmitted to a left and right front wheels through a left and right front wheel drive shafts 25L and 25R. Here, the front wheel drive shafts 25L and 25R are inserted into a left and right cylinder sections 26L and 26R on the left and right of the differential case 6 and spline-fitted to the side gears 22L and 22R, respectively.

In addition, the right side cylinder section 26R (on the right) of the differential case 6 is extended to the inside of the gear containing chamber 11 so that the driving force is transmitted through the extended right side cylinder 26R to the gear mechanism section 7.

Here, on an outer periphery of an intermediate section of the cylinder section 26R, an oil seal 27 held by the transfer case 9 is made in slidable contact with the cylinder section 26R. Due to the oil seal 27, liquid tightness is kept between the inside of the differential containing chamber 10 and the inside of the gear containing chamber 11. Additionally, when a lubricant for lubricating the front differential unit 5 is the same one as a lubricant for lubricating the gear mechanism section 7, the oil seal 27 can be omitted.

The gear mechanism section 7, as shown in FIGS. 1 and 2, is constituted by comprising a pair of bevel gears (a first and second bevel gears) 30 and 31 constituted by hypoid gears, and a pair of gears (a first and second gears) 32 and 33 constituted by helical gears.

The first bevel gear 30 is to be fixed to a hollow transfer shaft 34 spline-fitted to an outer periphery of the cylinder section 26R. With the first bevel gear 30, there is engaged the second bevel gear 31.

On the axis of the second bevel gear 31, a pinion shaft 31a as a transmission shaft section is integrally formed. The first gear 32 is spline-fitted to the pinion shaft 31a.

In addition, the second gear 33 is engaged on the right side of the first gear 32.

A gear shaft 33a of the second gear 33 is formed to be hollow. An output shaft 35 is rotatably inserted to the hollow gear shaft 33a.

The output shaft 35 is to be freely engaged and disengaged with the second gear 33 through the hydraulic multi plate clutch 8. In an engagement thereof, the driving force transmitted to the second gear 33 is transmitted to the output shaft 35 and is transmitted to a rear differential unit (not shown) through a propeller shaft 37 (refer to FIG. 4) spline-fitted to the output shaft 35.

Here, as shown in FIG. 3, the clutch containing chamber 12 for containing the hydraulic multi plate clutch 8 is to be disposed on the engine 1 side more closely thereto than the second gear 33 and on the axis of the output shaft 35. In the clutch containing chamber 12, end portions of the gear shaft 33a and the output shaft 35 are extendedly provided.

In an intermediate section on the gear shaft 33a, a pair of oil seals 36, 36 as sealing members are made in slidable contacted with the gear shaft 33a (refer to FIG. 3). The oil seals 36, 36 are held by a housing which supports the transfer case 9 and the gears 32 and 33. These oil seals 36, 36 are provided in parallel and in reverse in each of sealing directions thereof so that liquid tightness between the gear containing chamber 11 and the clutch containing chamber 12 is ensured.

Inside the clutch containing chamber 12, a clutch hub 40 of the hydraulic multi plate clutch 8 is fixed to the gear shaft 33a. While, a clutch drum 41 is fixed to the output shaft 35.

In addition, between the clutch hub 40 and the clutch drum 41, a plurality of drive plates 42 fitted to an outer periphery of the clutch hub 40 and a plurality of driven plates 43 fitted to the inner periphery of the clutch drum 41 are alternately disposed. Furthermore, on one end side of each of the plates 42 and 43 (on the engine 1 side), a piston 45 is disposed. While, on the other side of each of them (on the second gear 33 side), a retaining plate 46 is disposed.

The piston 45 is made slidably contacted with both the clutch drum 41 and the output shaft 35. A clearance surrounded by the piston 45 and the clutch drum 41 is formed as a hydraulic chamber 47. Additionally, a retainer 49 faces the piston 45. The retainer 49 is held by the output shaft 35, through a snap ring 48. Between the retainer 49 and the piston 45, a return spring 50 is provided. Due to the spring 50, the piston 45 is energized on the engine 1 side.

Additionally, the retaining plate 46 is held on the clutch drum 41 through a snap ring 52.

Here, a supply of a pressure of an operating fluid from a hydraulic control unit(not illustrated) to the hydraulic chamber 47 is practiced, through an oil passage 51 provided on the output shaft 35 as shown in FIG. 1. When the piston 45 is operated with the operating fluid supplied to the hydraulic chamber 47, the retaining plate 46 restricts shifting of the drive plate 42 and the driven plate 43 to the other end side so that an engagement of the drive plate 42 and the driven plate 43 is realized.

In such transfer 3, the driving force transmitted from the output shaft 15 of the transmission 2 through the final gear 17 to the differential case 6, is transmitted to the left and right front wheels, through the pinion shaft 20, the differential pinions 21, 21, the side gears 22L and 22R, and the drive shafts 25L and 25R.

Additionally, the driving force transmitted to the differential case 6 is also transmitted to the cylinder section 26R. The driving force transmitted to the cylinder section 26R is transmitted to the transfer shaft 34. The driving force transmitted to the transfer shaft 34 is, after the transmitting direction thereof is changed by 90° through the first and second bevel gears 30 and 31, transmitted to the pinion shaft 31a. Further, the driving force transmitted to the pinion shaft 31a is shifted rightward in parallel through the first and second gears 32 and 33, and transmitted to the gear shaft 33a. Furthermore, the driving force transmitted to the gear shaft 33a is transmitted to the output shaft 35 when the hydraulic multi plate clutch 8 is engaged, and then transmitted to the rear wheel side through the propeller shaft 37. Here, an engaging force of the hydraulic multi plate clutch 8 is variably controlled by the pressure of the operating fluid supplied from a hydraulic control unit(not illustrated) to the hydraulic chamber 47. Therefore, a variable control is carried out for a torque distribution to the front and rear wheels.

In this embodiment, the axis of the pinion shaft 31a for transmitting the driving force whose transmitting direction is changed by the first and second transmitting direction changing gears 30 and 31, is shifted in parallel through the first and second gears 32 and 33. In a clearance which is located on the axis of the shifted second gear 33 and on the engine 1 side more closely thereto than the second gear 33, the hydraulic multi plate clutch 8 is disposed. Thereby, the transfer 3 can be prevented from being made large-sized.

Namely, by shifting the axis of the pinion shaft 31a in parallel to itself through the first and second gears 32 and 33, the hydraulic multi plate clutch 8 can be made disposed in a clearance between the engine 1 and the gear mechanism section 7. In this structure, it is not necessary to dispose the hydraulic multi plate clutch 8 on the axes of the front wheel driving shafts 25L and 25R, or on the axis of the pinion shaft 31a. Therefore, it becomes possible to compactly constitute the transfer 3, and good mountability can be provided.

In particular, there is no necessity for disposing the hydraulic multi plate clutch 8 on the axis of the pinion shaft 31a. In the structure as shown in FIG. 4, the hydraulic multi plate clutch 8 is prevented from intersecting above or below of a steering gear box 60 and a cross member 61 which are arranged side to side at a front of a vehicle so that a good mountability can be provided. In other word, without changing the position of the steering gear box 60, and bending the cross member 61, a good positional relation can be kept among the hydraulic multi plate clutch 8 and those members. Thus, realization of ensuring passive safety can be easily achieved with a simple body structure. Furthermore, according to this structure, it is not necessary to intersect the hydraulic multi plate clutch 8 with the steering gear box 60 and the cross member 61, therefore, a sufficient cabin space and a ground clearance are conserved.

Moreover, the transmission of driving force is carried out by at least a pair of the gears 32 and 33, in addition to a pair of the bevel gears 30 and 31, so that a setting of the gear ratio on the rear wheel side is facilitated. Accordingly, setting of the gear ratio between the front wheel and the rear wheel in corresponding to various variations in specification of an engine or a body is realized more easily.

Furthermore, by disposing the hydraulic multi plate clutch 8 more closely to the engine 1 side than from the second gear 33 to the engine 1, it becomes easy to independently constitute the clutch containing chamber 12 in being liquid tight. Namely, according to this structure of this embodiment, the hydraulic multi plate clutch 8 is disposed more closely to the engine 1 side than the second gear 33, and the hydraulic multi plate clutch 8 is coupled to one end side of the gear shaft 33a and to one end side of the output shaft 35 inserted into the gear shaft 33a. Therefore, a seal for rotating sections can be made provided only on a peripheral section of the gear shaft 33a during forming the clutch containing chamber 12 in being liquid tight.

In addition, in the transfer case 9, by providing a lubricant in the clutch containing chamber 12 with a property different from those of lubricants in other containing chambers (differential containing chamber 10, gear containing chamber 11), it is possible to obtain the best characteristic of the hydraulic multi plate clutch 8.

Here, in the above embodiment, explanation was made as an example in which the axis of the output shaft 35 is shifted rightward through a pair of gears 32, 33. However, the present invention is not limited to this structure, but the axis of the output shaft 35 can be shifted to any position on a periphery of the pinion shaft 31a. Namely, depending on variation in the body frame or the location of the steering gear box, the axis of the output shaft 35 can be shifted, for example, to upward as shown in FIG. 5, or to downward as shown in FIG. 6.

In addition, the coupling mechanism section disposed between the second gear 33 and the engine 1 is not limited to the hydraulic multi plate clutch, but can be, for example, a viscous coupling, a dilatant fluid coupling, or some combination thereof.

a second embodiment of the present invention will be explained in the following with reference to drawings.

Figure 7:
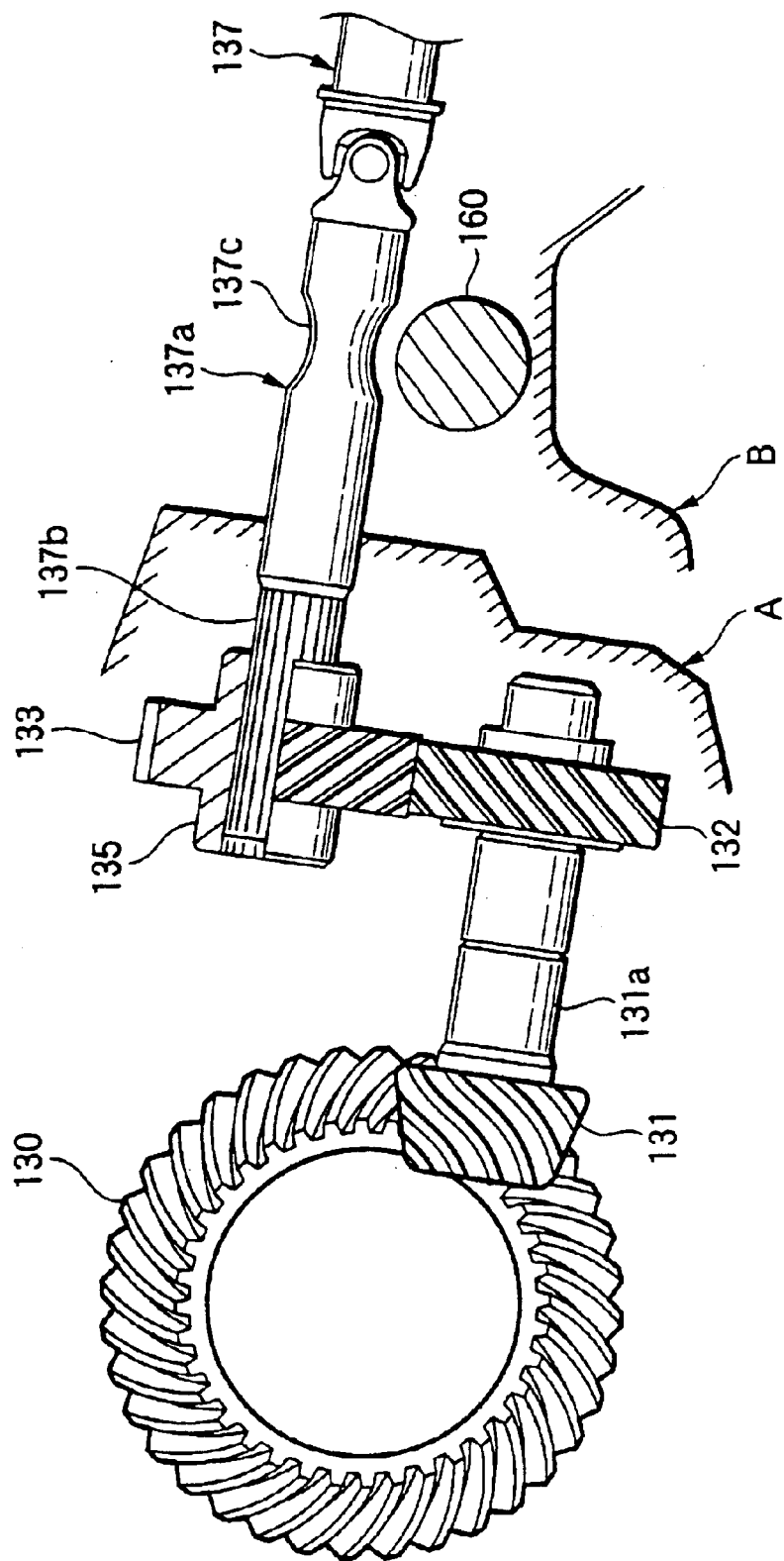
FIG. 7 is an illustration showing positional relation of each of sections from the final gear to the propeller shaft with the steering gear box according to the first embodiment of the invention.
Figure 8:
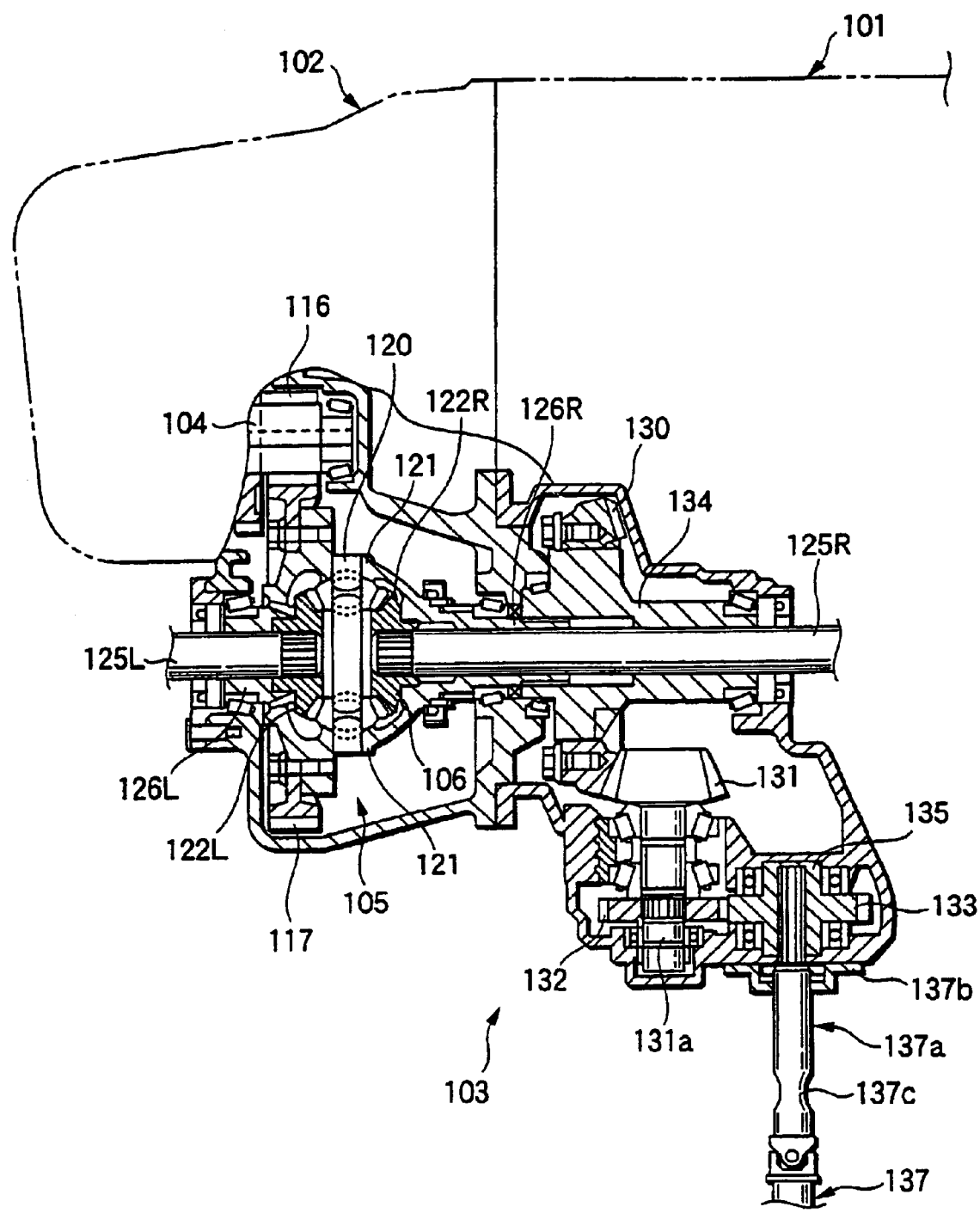
FIG. 8 is an illustration of the constitution on the transmission output side in the above.

FIG. 7 and FIG. 8 relate to the second embodiment of the present invention. FIG. 7 is an illustration showing positional relation between each of sections, from a final gear to a propeller shaft, and a steering gear box, and FIG. 8 is an illustration showing a constitution on a transmission output side.

In FIG. 8, reference numeral 101 denotes a laterally mounted front drive engine disposed in a front engine room of a vehicle. A driving power from the engine 101 is transmitted to a transmission 102 disposed on the left side of the engine room.

The driving power from the engine 101, with the revolution thereof reduced to a specified one by the transmission 102, is transmitted to a transfer 103. In a four-wheel drive vehicle, the driving power is transmitted by the transfer 103 to a rear wheel.

Namely, an output from the transmission 102 is transmitted from a drive gear 116 secured to a transmission output shaft 104 to a final gear 117 secured to a differential case 106 of a front differential gear unit 105, and transmitted to a front wheel. While, the driving power transmitted to the differential case 106 is transmitted to a propeller shaft 137 arranged in a front-to-rear direction in an approximately central section under a body, through bevel gears 130 and 131 which are formed with a pair of hypoid gears, and gears 132 and 133 which are formed with a pair of helical gears. The driving power is distributed from the propeller shaft 137, through an unillustrated viscous coupling, to a final reduction gear unit of rear wheels (not shown).

The front differential gear unit 105 is constituted of a bevel gear-type differential gear unit. The front differential gear unit 105 is constituted by containing differential pinions (bevel gears) 121 ratatably supported by a pinion shaft 120, left and right side gears 122L and 122R engaging with the differential pinions 121 and the like, in the differential case 106. In the unit, left and right front (axle) driving shafts 125L and 125R, which are spline-fitted into the side gears 122L and 122R, respectively, are rotatably inserted in left and right cylinder sections 126L and 126R, respectively.

The cylinder section 126R on the right side of the differential case 106 is extended long rightward. On the top of the cylinder section 126R, a cylindrical gear securing shaft 134 is spline-fitted. The cylindrical gear securing shaft 134 secures the drive gear 130 of the bevel gears on an outer peripheral thereof. The gear securing shaft 134 is provided along an outer periphery of the left driving shaft 125R, and each end thereof are supported by a tapered roller bearing.

The driven gear 131 engaged with the drive gear 130 of the hypoid gears is formed at a front end of a first output shaft 131a provided extendedly to a backward of the vehicle. The drive gear 132 of the helical gears is secured at the intermediate point of the first output shaft 131a.

The driven gear 133 engaged with the drive gear 132 of the helical gears is formed on an outer periphery of a hollow second output shaft 135 disposed in parallel with the first output shaft 131a. A spline shaft 137b is formed at a top of a front side input shaft 137a of the propeller shaft 137. Also, the spline shaft 137b is inserted into the hollow section of the second output shaft 135. Thereby, while the back-and-forth shift of the spline shaft 137b is allowed, the hollow second output shaft 135 is spline-fitted to the spline shaft 137b.

In addition, the propeller shaft 137 is constituted as being divided into two with three joints. Here, the front side input shaft 137a is formed in a solid. The top portion of the front side input shaft is formed in the spline shaft 137b, for being inserted into the second output shaft 135. Moreover, in an intermediate section between the spline shaft 137b and a front yoke (a position corresponding to that of a steering box 160 as described later), a narrowed section 137c is formed. Here, a depth of the narrowed section 137c, as required, has little influence in strength on the propeller shaft 13.

That is, in the second embodiment according to the present invention, the gear mechanism is constituted to comprise the front differential gear 105, the final gear 117, a pair of the bevel gears 130 and 131, a pair of the gears 132 and 133, the first output shaft 131a and the second output shaft 135. The transmission shaft section is constituted by the propeller shaft 137.

Next, a three-dimensional arrangement among the front differential gear 105, the final gear 117, a pair of the hypoid gears 130 and 131, a pair of the helical gears 132 and 133, the first output shaft 131a and the second output shaft 135, and the propeller shaft 137 will be explained.

As shown in FIG. 7, the axes of the front differential gear 105, the final gear 117, and the drive gear 130 of the hypoid gears are provided on the same axis of rotation with the axes of the front wheels (the left and right driving axes 125L and 125R). By an engagement of the drive gear 130 of the hypoid gear with the driven gear 131, the axis of rotation of the driven gear 131 of the hypoid gears is changed backwardly by 90°. That is, the direction of the output axis of the first output shaft 131a is also changed backwardly by 90°.

The driven gear 131 of the hypoid gears and the drive gear 132 of the helical gears are rotated with the first output shaft 131a being taken as the axes of rotation. A direction of the output to be directed to the backward is shifted upward in parallel from itself, by an engagement of the drive gear 132 with the driven gear 133 of the helical gears.

The driven gear 133 of the helical gears takes the second output shaft 135 as the axis of rotation thereof. From the second output shaft 135, a power is transmitted through the input shaft 137a to the propeller shaft 137.

On immediately downward the narrowed portion 137c of the input shaft 137a, a steering gear box 160 of a power steering system, as the vehicle constituting members provided from side to side to the vehicle, is disposed so as to cross at right angle to the input shaft 137a of the propeller shaft. In FIG. 7, a broken line A shows a rough outer fringe of a case of the transfer 103, and a broken line B roughly shows a position of a bottom of the body.

In this way, according to the second embodiment of the present invention, the steering gear box 160 is avoided in a position, due to a pair of the helical gears 132 and 133. In this structure, the steering gear box 160 can be disposed at the optimum position without changing the geometrical arrangement thereof.

In addition, the front side input shaft 137a of the propeller shaft 137 is formed in a solid so that it is possible to make diameter of the front side input shaft smaller. Further, since the narrowed portion 137c of the front side input shaft 137a have a further smaller shaft diameter, the steering gear box 160 can be disposed at the optimum position without changing the geometrical arrangement thereof. Thus, the power transmitting system can be made advantageous in suppressing vibration and noise while easily overcoming specified limitations, and various variations in specification of an engine or a body can be easily complied so that a degree of flexibility in setting is increased.

The input shaft 137a of the propeller shaft is directly spline-fitted to the shaft (second output shaft) 135 of the driven gear 133 of the helical gears. In this structure, the transfer 103 of the input shaft section can be made small, it is advantageous for arranging the steering gear box 160 and the like.

Furthermore, a pair of the helical gears 132 and 133 is provided behind a pair of the hypoid gears 130 and 131. Therefore, in order to meet the final reduction ratio of front wheels with that of rear wheels, a suitable gear ration can be determined by adjusting the gear ratios of the two pairs, so that a high degree of design flexibility is achieved.

In the explanation of the second embodiment, the steering gear box 160 of the power steering system is taken as an example of the vehicle constituting members being the propeller shaft 137 to be avoid. However, besides this, the member can be a cross member or the like that constitutes a body frame. In addition, although the explanation has been made with the laterally mounted front drive engine taken as the example, the present invention can be applied to a vehicle with a longitudinally mounted engine.

Figure 9A:
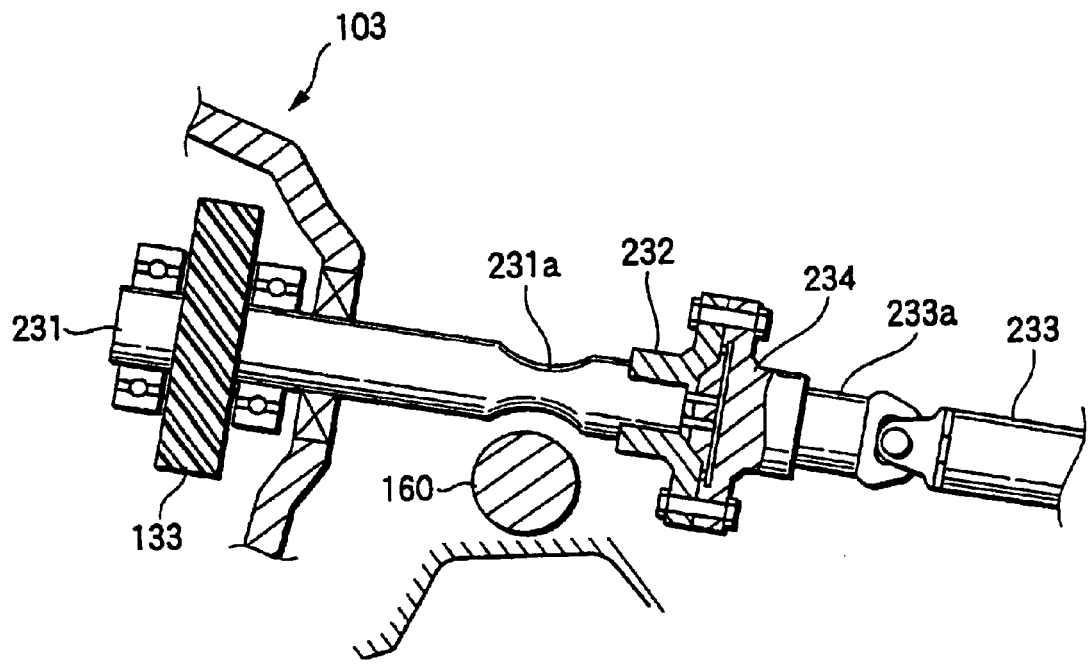
FIGS. 9A and 9B are illustrations showing the connection between the output shaft from the transfer and the propeller shaft according to the second embodiment of the invention.
Figure 9B:
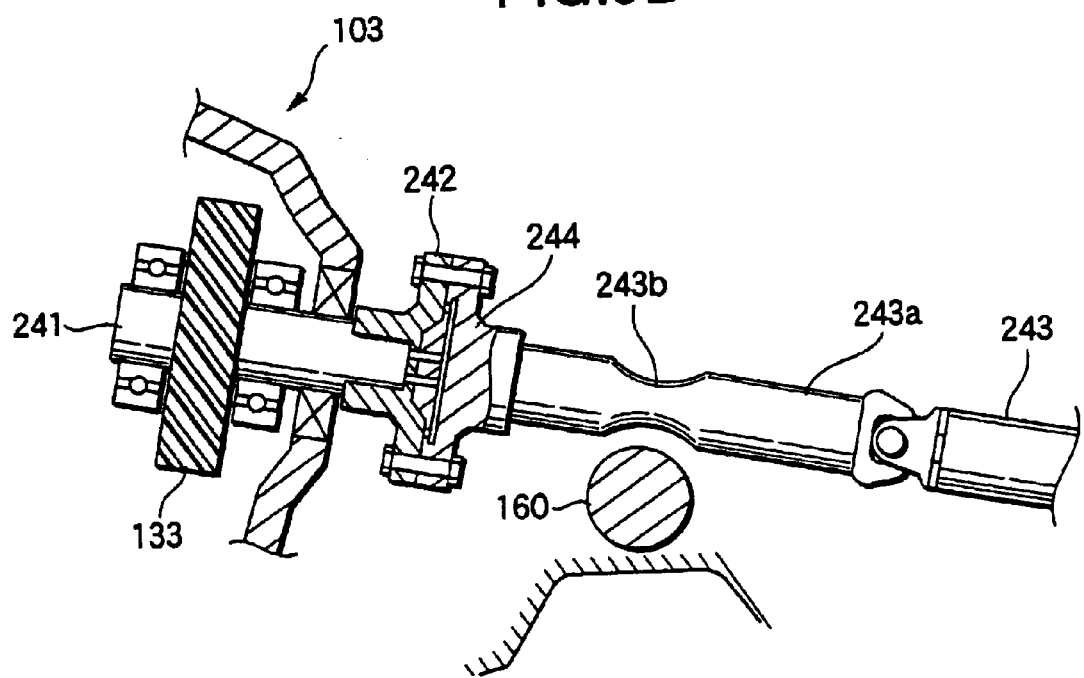

Next, FIGS. 9A and 9B relate to a third embodiment according to the present invention, and FIGS. 9A and 9B are illustrations showing a connection between the output shaft from the transfer and the propeller shaft. Additionally, the third embodiment differs from the second embodiment in that the output shaft from the transfer is made coupled to the propeller shaft by a flange joint. With respect to other similar parts to those in the second embodiment, they are designated by the same reference numerals and characters with explanations thereof being omitted.

Namely, in correspondence with the second output shaft 135 in the first embodiment, a transfer output shaft 231 is provided on the axis of the driven gear 133 of the helical gear so that the transfer output shaft 231 is protruded to an outside of the transfer case.

As shown in of FIG. 9A, the transfer output shaft 231 is formed into a solid shaft. A flange joint 232 is fixed at the top of the transfer output shaft 231 by lock nuts.

In addition, a flange joint 234 is provided at a top of an input shaft 233a of a propeller shaft 233. The flange joint 234 is coupled to the flange joint 232 of the transfer output shaft 231. Incidentally, back-and-forth slides of the propeller shaft 233 is made to be absorbed by an unillustrated double offset joint provided in the propeller shaft 233 or a spline connection made on the rear wheel side.

The transfer output shaft 231 is formed longer than the input shaft 233a. The steering gear box 160 is located, as the vehicle constituting members provided from side to side to the vehicle, at immediately downward of the transfer output shaft 231.

Moreover, a narrowed section 231a is formed at a position on the transfer output shaft 231 corresponding to the steering gear box 160. A shaft diameter of the narrow section is adapted to allow transmission strength of transmitted power. In this structure, a sufficient space for locating the steering gear box 160 is conserved.

In this way, according to the third embodiment, the transfer output shaft 231 is formed into a solid shaft. The transfer output shaft 231 is located above the steering gear box 160, provided from side to side to the vehicle, so that the transfer output shaft 231 is flange coupled to the input shaft 233a of the propeller shaft 233. In this structure, the arrangement of the steering gear box 160 can be facilitated. In addition, the steering gear box 160 can be arranged at the optimum position without changing the geometrical arrangement thereof. Thus, the power transmitting system can be made advantageous in suppressing vibration and noise while easily overcoming specified limitations, and various variations in specification of an engine or a body can be easily complied. Further, a degree of flexibility in setting can be increased. Furthermore, the transfer output shaft 231 have a shaft diameter made smaller at the narrowed section 231a so that it is more advantageous in arranging the steering gear box 160.

In of FIG. 3B, there is shown an example of a modification of the embodiment shown in of FIG. 3A. Namely, at a rear end of a transfer output shaft 241, a flange joint 242 is fixed by lock nuts. In addition, an input shaft 243a of a propeller shaft 243 is formed in a solid shaft. A flange joint 244 is provided at a top end to the solid shaft so that the flange joint 242 is coupled to the flange joint 42 of the transfer output shaft 241. Incidentally, back-and-forth slides of the propeller shaft 243 is made to be absorbed by an unillustrated double offset joint provided in the propeller shaft 243 or a spline connection made on the rear wheel side.

Here, the input shaft 243a of the propeller shaft 243 is formed longer than a length of a portion which is protruded outwardly from the transfer output shaft 241. The steering gear box 160 is located, as the vehicle constituting members provided from side to side to the vehicle, at immediately downward of the input shaft 243*a*.

Moreover, a narrowed section 243*b* is formed at a position on the input shaft 243*a* corresponding to the steering gear box 160. Here, a shaft diameter of the narrow section is adapted to allow transmission strength of transmitted power. Thereby, a sufficient space for locating the steering gear box 160 is conserved.

According to the example of the modification of the third embodiment, the input shaft 243*a* of the propeller shaft 243 is formed into a solid shaft the input shaft 243*a* is located above the steering gear box 160, provided from side to side to the vehicle, so that the input shaft 243*a* is flange coupled to the transfer output shaft 241. Thus, it is possible to obtain the same effects as those of the third embodiment.

In the third embodiment and the example of the modification thereof, the steering gear box 160 of the power steering system as the vehicle constituting members is avoided downwardly from the transfer output shaft 231 (241). However, according to each of vehicle forms, the transfer output shaft 231 (241) is disposed upwardly of the transfer output shaft 231(241) to avoid interfering with each other in a position.

In the above embodiments, explanations thereof are made with a 4WD vehicle taken as an example. However, without being limited to this, the present invention can be applied even to a front engine rear drive 2WD vehicle. Moreover, the constitution of the above described 4WD vehicle may be another one, for example, a structure in which a center differential gear unit is included in a transfer, or a structure in which a power transmitting system of front wheels is different from that of rear wheels, and the like.

As explained above, according to the first embodiment of the present invention, an axis of the transmission shaft section, whose transmission direction is changed by a pair of gears, is shifted in parallel to itself through the first gear provided on the transmission shaft section and the second gear engaged with the first gear. In addition to this structure, the output shaft is rotatably inserted into the axis of the second gear for transmitting the driving force to the propeller shaft. A coupling mechanism section couples the second gear shaft and the output shaft in such a manner that engagement and disengagement of the both shafts are freely allowed. The coupling mechanism section is disposed on the axis of the second gear, and is more closely to the engine side than from the second gear to the engine. Thus, a power transmitting system of a four wheel drive vehicle can be provided as being compact with good mountability.

In addition, according to the second and third embodiments of the present invention, the power transmitting system for a vehicle exhibits excellent effects of being small. Further, a good positional relation of a steering mechanism without changing a geometrical arrangement can be kept. Thus, it is advantageous in suppressing vibration and noise while easily overcoming specified limitations. Therefore, various variation in specification of an engine or a body can be easily complied. A high degree of flexibility in setting can be achieved.

Further, the structure of the first embodiment can be applied for the structures as shown in the second and the third embodiment. While, the structures of the second and the third embodiment can be applied for the structure as shown in the first embodiment.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A power transmitting system for a vehicle, in which driving force provided from a transmission coupled to a laterally mounted front drive engine is distributed to front and rear wheels through a transfer disposed behind said engine, said transfer comprises:

a transmission shaft section;

a pair of bevel gears which changes a transmission direction of the driving force;

a first gear provided on said transmission shaft section having said transmission direction being changed by one of said bevel gears;

a second gear engaged with said first gear, which shifts an axis of said transmission shaft section in parallel;

an output shaft which is rotatably inserted into a gear shaft of said second gear so that the driving force is transmitted to said transmission shaft section; and a coupling mechanism section which controls a transmission torque between said gear shaft of said second gear and said output shaft, wherein said coupling mechanism section is disposed on an axis of said second gear, and is closer to said engine than said second gear.

2. The power transmitting system according to claim 1, comprising:

a coupling mechanism-containing chamber which contains said coupling mechanism section independently provided in a transfer case of said transfer; and a seal member made slidably contacted around said gear shaft of said second gear extendedly provided into said coupling mechanism-containing chamber in such a manner that a liquid tight separation between said coupling mechanism-containing chamber and other containing chambers containing other parts is performed.

3. The power transmitting system according to claim 1, wherein said coupling mechanism section is a hydraulic multi plate clutch.

4. The power transmitting system according to claim 1, wherein said coupling mechanism section is a coupling which generates a transmission torque depending on a difference between a front wheel rotation and a rear wheel rotation or on an input torque.

\* \* \* \* \*